(12) United States Patent
Gotoh et al.

(10) Patent No.: US 10,005,435 B2
(45) Date of Patent: Jun. 26, 2018

(54) VEHICLE BRAKE DEVICE

(71) Applicant: NISSAN MOTOR CO., LTD., Yokohama-shi, Kanagawa (JP)

(72) Inventors: Shinnosuke Gotoh, Kanagawa (JP); Toshihiro Ono, Sagamihara (JP)

(73) Assignee: NISSAN MOTOR CO., LTD., Yokohama-Shi (JP)

( * ) Notice: Subject to any disclaimer, the term of this patent is extended or adjusted under 35 U.S.C. 154(b) by 0 days. days.

(21) Appl. No.: 14/767,495

(22) PCT Filed: Dec. 26, 2013

(86) PCT No.: PCT/JP2013/007624
§ 371 (c)(1),
(2) Date: Aug. 12, 2015

(87) PCT Pub. No.: WO2014/125551
PCT Pub. Date: Aug. 21, 2014

(65) Prior Publication Data
US 2016/0031422 A1    Feb. 4, 2016

(30) Foreign Application Priority Data

Feb. 15, 2013 (JP) ................................. 2013-027300

(51) Int. Cl.
*B60T 7/06* (2006.01)
*G05G 1/327* (2008.04)
*B60T 11/16* (2006.01)

(52) U.S. Cl.
CPC ............... *B60T 7/06* (2013.01); *B60T 7/065* (2013.01); *B60T 11/16* (2013.01); *G05G 1/327* (2013.01)

(58) Field of Classification Search
CPC ............... B60T 7/04; B60T 7/06; B60T 7/065
See application file for complete search history.

(56) References Cited

U.S. PATENT DOCUMENTS 2,791,203 A * 5/1957 Ayers, Jr. ............... B60T 13/244
  188/152
2,809,725 A * 10/1957 Ayers, Jr. ................. B60T 7/04
  188/357

(Continued)

FOREIGN PATENT DOCUMENTS

CN    1164490 A    11/1997
CN    1706700 A    12/2005

(Continued)

*Primary Examiner* — Nathaniel Wiehe
*Assistant Examiner* — Michael Quandt
(74) *Attorney, Agent, or Firm* — Foley & Lardner LLP (57) ABSTRACT

The vehicle brake device has the invalid depression region in a brake pedal operation by a driver. The vehicle brake device includes an input rod configured to move forward and rearward in conjunction with a depression operation of a brake pedal and a pedal bias unit configured to bias the input rod in a direction to which the brake pedal returns when the depression operation position of the brake pedal lies within the invalid depression region. The pedal bias unit includes an elastic body including one end portion attached to the input rod and the other end portion attached to the vehicle body side member to provide a spring force to the input rod in the direction to which the brake pedal returns.

4 Claims, 8 Drawing Sheets

(56) References Cited

U.S. PATENT DOCUMENTS

| | | | | |
|---|---|---|---|---|
| 3,219,775 A | * | 11/1965 | Carpenter | B60Q 1/441 |
| | | | | 200/553 |
| 4,458,490 A | * | 7/1984 | Newhouse | B60T 13/52 |
| | | | | 60/547.1 |
| 5,176,065 A | | 1/1993 | Castel et al. | |
| 6,339,971 B1 | | 1/2002 | Kato | |
| 6,810,766 B2 | * | 11/2004 | Mizuma | B60R 21/09 |
| | | | | 74/512 |
| 2005/0269875 A1 | | 12/2005 | Maki et al. | |
| 2012/0139330 A1 | * | 6/2012 | Morishita | B60T 1/10 |
| | | | | 303/3 |

FOREIGN PATENT DOCUMENTS

| | | |
|---|---|---|
| JP | 60-16227 U | 2/1985 |
| JP | 7-17371 A | 1/1995 |
| JP | 9-254821 A | 9/1997 |
| JP | 10-175568 A | 6/1998 |
| JP | 2006-264632 A | 10/2006 |

* cited by examiner

VEHICLE BRAKE DEVICE

TECHNICAL FIELD

This disclosure relates to a vehicle brake device in which there is an invalid depression region in a brake pedal operation by a driver.

BACKGROUND ART

As a conventional vehicle brake device, a device described in PTL 1 is known, for example. This vehicle brake device has a configuration in which a sleeve is coaxially disposed on an outer circumference of an input rod extending from a brake booster. The input rod receives a depression force associated with a depression operation on a brake pedal via the sleeve. Furthermore, a coil spring is disposed between the sleeve and a fixed portion of the brake booster, and the spring biases the sleeve with respect to the fixed portion, toward the brake pedal side.

Then, in the configuration of the vehicle brake device, forward and rearward movement of the sleeve associated with the depression operation on the brake pedal is not transmitted to the input rod and to the brake booster by the action of the spring, until the depression amount of the brake pedal reaches or exceeds a predetermined pedal depression amount. Furthermore, a predetermined pedal reaction force is generated due to compressive deformation of the spring at this time.

CITATION LIST

Patent Literature

PTL 1: JP H07-17371 A

SUMMARY OF INVENTION

Technical Problem

The spring is disposed coaxially with the input rod such that the spring covers the outer circumference of the input rod at the front of the sleeve. Thus, the spring restricts a displacement of the input rod in the direction perpendicular to the axis direction, and a displacement of the brake pedal coupled to the input rod is disturbed, accordingly.

The present disclosure has been made in view of the above-mentioned problem, and has an object to allow a more displacement of the input rod in the direction perpendicular to the axis direction in the vehicle brake device in which there is the invalid depression region, even if there is an elastic body for generating the pedal reaction force.

Solution to Problem

In order to solve the above-mentioned problem, according to an aspect of the present disclosure, there is provided a vehicle brake device in which there is an invalid depression region in a brake pedal operation by a driver. The vehicle brake device includes a pedal bias unit configured to bias an input rod in a direction in which a brake pedal returns, when a depression operation position of the brake pedal lies at least within the invalid depression region, the input rod moving forward and rearward in conjunction with a depression operation of the brake pedal. The pedal bias unit includes an elastic body. One end portion of the elastic body is attached to the input rod, and the other end portion of the elastic body is attached to a vehicle body side member. The elastic body is configured to provide a spring force to the input rod in the direction to which the brake pedal returns.

DESCRIPTION OF EMBODIMENTS

Hereinafter, embodiments of the present disclosure will now be described with reference to the drawings.

(Configuration)

Description will be made by an example of a case where a vehicle brake device according to the present disclosure is applied to a hybrid vehicle including a regeneration cooperation brake control device.

First, a configuration of a driving system of the hybrid vehicle will be described.

Figure 1:
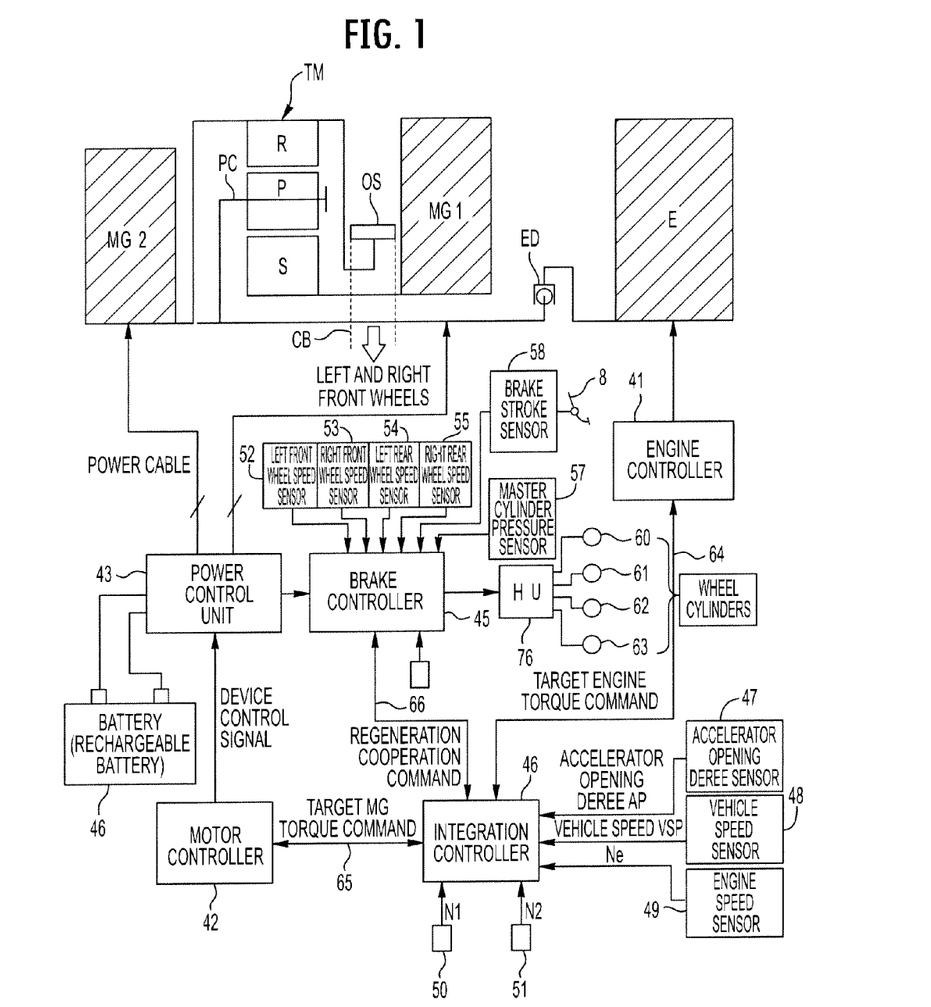
FIG. 1 is a view illustrative of a configuration of a driving system in a hybrid vehicle according to an embodiment of the present disclosure.

FIG. 1 is a view illustrative of a whole system of a driving system of the hybrid vehicle to which the regeneration cooperation brake control device according to the present embodiment is applied.

As illustrated in FIG. 1, the driving system of the hybrid vehicle includes an engine E, the first motor generator MG1 (generator), the second motor generator MG2, an output sprocket OS, and a power dividing mechanism TM.

The engine E may be a gasoline engine or a diesel engine, and a valve opening degree of a throttle valve thereof or the like is controlled on the basis of a control command from an engine controller 41 described later.

Each of the first motor generator MG1 and the second motor generator MG2 is a synchronous motor generator which has a rotor in which permanent magnets are embedded and a stator around which stator coils are wound. The first motor generator MG1 and the second motor generator MG2 are separately controlled by applying three-phase alternating currents produced by a power control unit 43 on the basis of a control command from a motor controller 42 described later.

Each of the motor generators MG1 and MG2 is capable of operating as an electric motor configured to rotationally drive with a power supplied from a battery 44 (hereinafter, such a operating state is referred to as a "driving state"). Furthermore, each of the motor generators MG1 and MG2 is capable of operating as a generator configured to develop an electromotive force at both ends of the stator coil to charge the battery 44 when the rotor is rotated by an external force (hereinafter, such an operating state is referred to as a "regeneration state").

The power dividing mechanism TM is constituted of a simple planetary gear train including a sun gear S, a pinion P, a ring gear R, and a pinion carrier PC. A coupling relation among the three rotational elements (the sun gear S, the ring gear R, and the pinion carrier PC) of the simple planetary gear train, input members, and output members will be described. The sun gear S is coupled to the first motor generator MG1. The ring gear R is coupled to the second motor generator MG2 and the output sprocket OS. The pinion carrier PC is coupled to the engine E via an engine damper ED. It is to be noted that the output sprocket OS is coupled to a left front wheel and a right front wheel via a differential, a drive shaft (not illustrated), a chain belt CB, or the like.

Next, a control system of the hybrid vehicle will be described.

As illustrated in FIG. 1, the control system of the hybrid vehicle according to the present embodiment includes the engine controller 41, the motor controller 42, a power control unit 43, the battery 44 (rechargeable battery), a brake controller 45, and an integration controller 46.

The integration controller 46 is configured to receive input information from an accelerator opening degree sensor 47, a vehicle speed sensor 48, an engine speed sensor 49, the first motor generator rotation speed sensor 50, and the second motor generator rotation speed sensor 51.

The integration controller 46 is configured to perform a function to manage energy consumption over the whole of the vehicle to run the vehicle with a highest efficiency. That is, the integration controller 46 is configured to control an engine operation point by the control command to the engine controller 41 in acceleration travelling. Furthermore, the integration controller 46 is configured to control a motor generator operation point by the control command to the motor controller 42 in stopping, travelling, braking, or the like. The integration controller 46 is configured to receive an accelerator opening degree AP, a vehicle speed VSP, an engine speed Ne, the first motor generator rotation speed N1, and the second motor generator rotation speed N2 from sensors 47, 48, 49, 50, and 51, respectively. Then, the integration controller 46 is configured to perform a predetermined computing processing on the basis of the inputted information to output the control commands based on the processing result to the engine controller 41 and the motor controller 42. It is to be noted that a bidirectional communication line 64 is connected between the integration controller 46 and the engine controller 41, a bidirectional communication line 65 is connected between the integration controller 46 and the motor controller 42, and a bidirectional communication line 66 is connected between the integration controller 46 and the brake controller 45, for information exchange.

The engine controller 41 is configured to output a command for controlling the engine operation point (Ne, Te) depending on a target engine torque command from the integration controller 46, or the like, to a throttle valve actuator, not illustrated, for example. Herein, the integration controller 46 is configured to compute the target engine torque command or the like on the basis of the accelerator opening degree AP from the accelerator opening degree sensor 47 and the engine speed Ne from the engine speed sensor 49.

The motor controller 42 is configured to compute a command for controlling the motor operation point (N1, T1) of the first motor generator MG1 depending on a target motor generator torque command from the integration controller 46, or the like. Separately from this, the motor controller 42 is configured to compute a command for controlling the motor operation point (N2, T2) of the second motor generator MG2 depending on the target motor generator torque command from the integration controller 46, or the like. Then, the motor controller 42 is configured to output these computed commands to the power control unit 43. It is to be noted that the motor controller 42 is configured to use information of a battery SOC indicative of a state of charge of the battery 44. Furthermore, the integration controller 46 is configured to obtain the target motor generator torque command or the like on the basis of the motor generator rotation speeds N1 and N2 from the motor generator rotation speed sensors 50, 51 with resolvers.

The power control unit 43 includes a joint box, a boosting converter, an inverter for a drive motor and an inverter for a generator, which are not illustrated. Then, the power control unit 43 constitutes a high voltage power supply system capable of supplying the power to each of the motor generators MG1 and MG2 with less current. The stator coil of the second motor generator MG2 is connected to the inverter for the drive motor. The stator coil of the first motor generator MG1 is connected to the inverter for the generator. Furthermore, the joint box is connected to the battery 44 which is discharged in the driving state and charged in the regeneration state.

Furthermore, the power control unit 43 is configured to obtain an effective regeneration torque T(t) to output the effective regeneration torque T(t) to the brake controller 45.

The brake controller 45 is configured to receive input information from a left front wheel speed sensor 52, a right front wheel speed sensor 53, a left rear wheel speed sensor 54, a right rear wheel speed sensor 55, a master cylinder pressure sensor 57, and a brake stroke sensor 58. Then, the brake controller 45 is configured to perform a regenerative brake cooperation control when braking by an engine brake or an operation of a brake pedal 8a, by outputting a control command to the integration controller 46 and a control command to a brake hydraulic unit 76.

(Brake Device)

Next, a basic configuration of a hydraulic brake device in a braking system to which the vehicle brake device according to the present embodiment is applied will be described with reference to FIG. 2.

Figure 2:
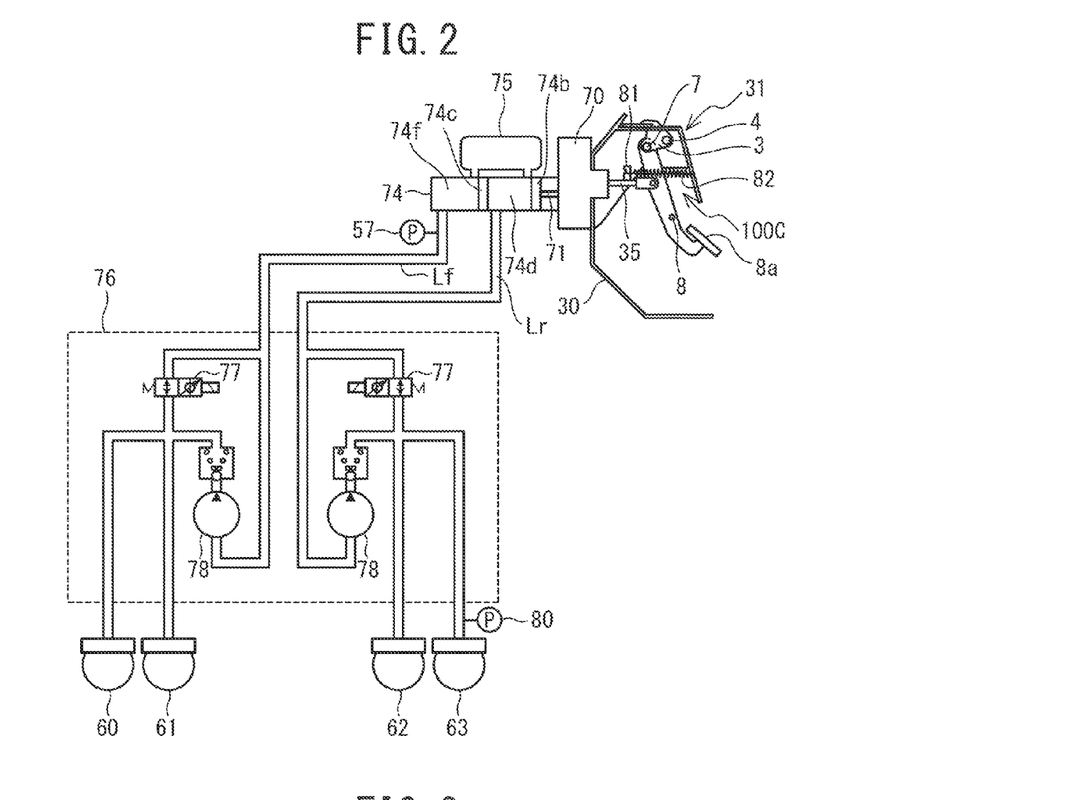
FIG. 2 is a view illustrative of a basic configuration of a hydraulic brake device according to an embodiment of the present disclosure.

In FIG. 2, reference symbol 8a denotes a brake pedal to be operated by the driver to instruct a required braking torque. The brake pedal 8a is disposed on a lower portion of a pedal arm 8. The pedal arm 8 extends in the substantially vertical direction. An upper portion 7 of the pedal arm 8 is supported such that the pedal arm 8 is rotatable relatively to a vehicle body side member 31. A rear end portion of an input rod 35 is coupled to a midway position in the vertical direction of the pedal arm 8. Thus, the brake pedal 8a is coupled to a servo unit 70 via the input rod 35, and the servo unit 70 is coupled to the master cylinder 74 via a push rod 71. Therefore, the depression force generated by depressing the brake pedal is input to the servo unit 70 via the input rod 35. Then, the servo unit 70 is configured to boost the pedal depression force which depends on the depressing amount of the brake pedal 8a, to move pistons 74b and 74c in the master cylinder 74 forward and rearward via the push rod 71. Reference symbol 75 denotes a reservoir tank for braking fluid.

The master cylinder 74 is connected to wheel cylinders 60 to 63 for the respective wheels via a pipe line constituting a hydraulic circuit 76. A proportional type electromagnetic valve 77 for controlling fluid pressure is inserted on the upstream side of the pipe line. FIG. 2 illustrates a state where the proportional type electromagnetic valve 77 for controlling fluid pressure is not energized and the fluid in the master cylinder 74 is supplied to the wheel cylinders 60 to 63 directly. The proportional type electromagnetic valve 77 for controlling fluid pressure is configured to adjust the fluid (fluid pressure) supplied from the master cylinder 74 to wheel cylinders 60 to 63 depending on a control current from the brake controller 45. Furthermore, the pipe line includes a brake control pump 78. The intake of the brake control pump 78 is connected to the master cylinder 74 and the exhaust port of the brake control pump 78 communicates with the wheel cylinders 60 to 63. The brake control pump 78 is configured to increase the cylinder pressure of the wheel cylinders 60 to 63 on the basis of a control command from the brake controller 45.

It is to be noted that a proportional type electromagnetic valve for controlling fluid pressure for boosting (hereinafter, referred to as "boosting electromagnetic valve") or a proportional type electromagnetic valve for controlling fluid pressure for decompression (hereinafter, referred to as "decompression electromagnetic valve") used for ABS control or the like may be provided on the pipe lines Lf and Lr connected to the master cylinder 74 such that the braking fluid pressure in the respective wheel cylinders 60 to 63 can be separately controlled. Furthermore, a master cylinder pressure sensor 57 is configured to detect an output pressure of the master cylinder 74 and to supply the detection signal to the brake controller 45. Furthermore, a pressure sensor 80 is configured to detect brake fluid pressures in the respective wheel cylinders 60 to 63 and to output detection signals to the brake controller 45.

The vehicle brake device according to the present embodiment further includes a depression invalidation mechanism 100A, a pedal rearward movement suppression mechanism 100b, and a pedal bias unit 100C.

The depression invalidation mechanism 100A is configured to make at least one hydraulic chamber 74d of the master cylinder 74 communicate with the reservoir tank 75, when the depression operation position of the brake pedal 8a lies within a preset invalid depression region. The depression invalidation mechanism 100A is a mechanism configured to suppress a generation of a base hydraulic pressure by the master cylinder 74 within the invalid depression region. In the depression invalidation mechanism 100A according to the present embodiment, the invalid depression region is set to be a region from a pedal depression start position to a position where the depression amount of the brake pedal reaches a preset initial depression amount. In the invalid depression region, the generation of the base hydraulic pressure by the master cylinder 74 is suppressed.

That is, the depression invalidation mechanism 100A is a mechanism configured to invalidate a stroke of the input rod 35 or the push rod 71 corresponding to the operation of the brake pedal 8a within the invalid depression region to prevent the generation of the base hydraulic pressure in the master cylinder 74. The depression invalidation mechanism 100A may be provided in the servo unit 70, may be provided between the brake pedal 8a and the input rod 35 of the servo unit 70 like the above-mentioned prior art document, or may be provided in the master cylinder 74. When the depression invalidation mechanism 100A is provided in the servo unit 70, the depression invalidation mechanism 100A may include, for example, a mechanism to suppress the stroke of the push rod 71 corresponding to the stroke of the input rod 35 depending on the operation of the brake pedal 8a within the invalid depression region.

An example in which the depression invalidation mechanism 100A is provided in the master cylinder 74 will be described with reference to FIG. 3.

Figure 3:
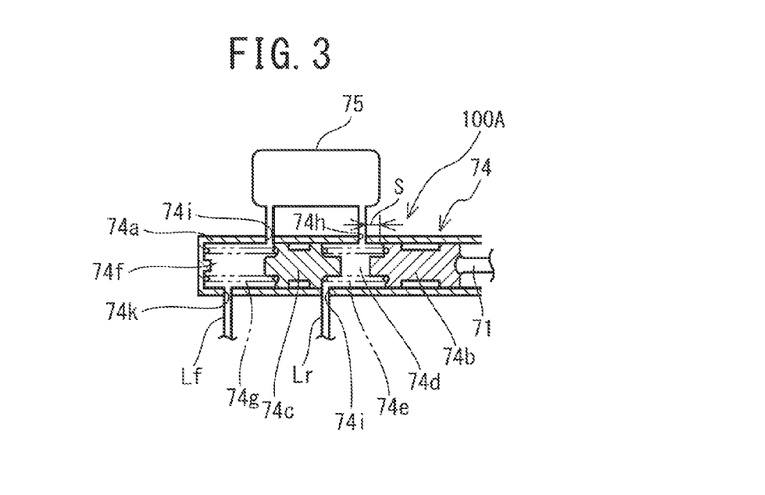
FIG. 3 is a view illustrative of examples of a master cylinder and a depression invalidation mechanism.

Herein, the master cylinder 74 according to the present embodiment is a tandem type master cylinder 74 as illustrated in FIG. 3, and includes a housing 74a formed in a bottomed cylindrical shape. The first and second pistons 74b and 74c are housed in the housing 74a side by side, in a liquid-tight and slidable manner. A first spring 74e is disposed in the first hydraulic chamber 74d formed between the first piston 74b and the second piston 74c. A second spring 74g is disposed in a second hydraulic chamber 74f formed between the second piston 74c and a closed end of the housing 74a. In this way, the second piston 74c is biased to an opening end side (the first piston 74b side) by the second spring 74g, and the first piston 74b is biased to the opening end side by the first spring 74e. As a result, one end (an end on the opening end side) of the first piston 74b comes into contact with and is pressed to a tip of the push rod 71 extending from the servo unit 70.

The housing 74a of the master cylinder 74 is provided with a first port 74h by which the first hydraulic chamber 74d is communicated with the reservoir tank 75 and a second port 74i by which the second hydraulic chamber 74f is communicated with the reservoir tank 75.

When the first piston 74b is positioned at a first position (a returning position) in a state (a state illustrated in FIG. 3) in which the foot of the driver leaves from the brake pedal 8a (that is, the brake pedal 8a is not depressed), the first port 74h is provided at the second position away from a closing end for closing the first port 74h, of the first piston 74b located at the first position by an invalid stroke distance "s" in a pressure-increasing direction of the first piston 74b (direction toward the closing end: the left direction in FIG. 3). When the second piston 74c is positioned at a certain position (a returning position) in a state (the state illustrated in FIG. 3) in which the foot of the driver leaves from the brake pedal 8a, the second port 74i is provided such a position that the position of a closing end for closing the second port 74i, of the second piston 74c located at the certain position, coincides with the position of an opening end of the second port 74i (that is, the second port 74i is provided such a position that the closing end of the second piston 74c positioned at the certain position is about to start to close the opening the second port 74i).

It is to be noted that when the first piston 74b moves from a initial position by the invalid stroke distance "s", the restriction on generation of the base hydraulic braking force is released (release of the depression invalidation mechanism) and the brake enters a brake operation state in which the base hydraulic braking force starts rising corresponding to a state of the brake operation. The above-mentioned mechanism for constituting the invalid stroke distance "s" is the depression invalidation mechanism 100A. It is preferable that the invalid stroke distance "s" be set such that the regenerative brake generates a maximum regenerative brake force when the brake operation state is a predetermined state. In this way, when the brake operation state becomes the predetermined state, the master cylinder 74 releases the restriction on generation of the base hydraulic braking force and the regenerative brake generates the maximum regenerative brake force.

Furthermore, the housing 74a of the master cylinder 74 is provided with a third port 74j by which the first hydraulic chamber 74d is communicated with a oil pathway Lr constituting a system for rear wheels and a fourth port 74k by which the second hydraulic chamber 74f is communicated with a oil pathway Lf constituting a system for front wheels.

Next, the pedal rearward movement suppression mechanism 100B will be described. The pedal rearward movement suppression mechanism 100B is a mechanism for suppressing a rearward movement (a movement toward a driver's seat) of the brake pedal 8a at the time of a front collision of the vehicle. In the present embodiment, an example to which the pedal rearward movement suppression mechanism 100B is applied will be described. That is, the pedal rearward movement suppression mechanism 100B is provided with a rotary supporting unit that rotatably supports the brake pedal Ba relative to a vehicle body side member 31. When an impact stronger than a predetermined strength is input in a front-rear direction of the vehicle, the rotary supporting unit is displaced rearward in the front-rear direction of the vehicle to suppress the rearward movement of the brake pedal 8a.

An example of the pedal rearward movement suppression mechanism 100B will be described with reference to FIGS. 4 to 7.

Figure 4:
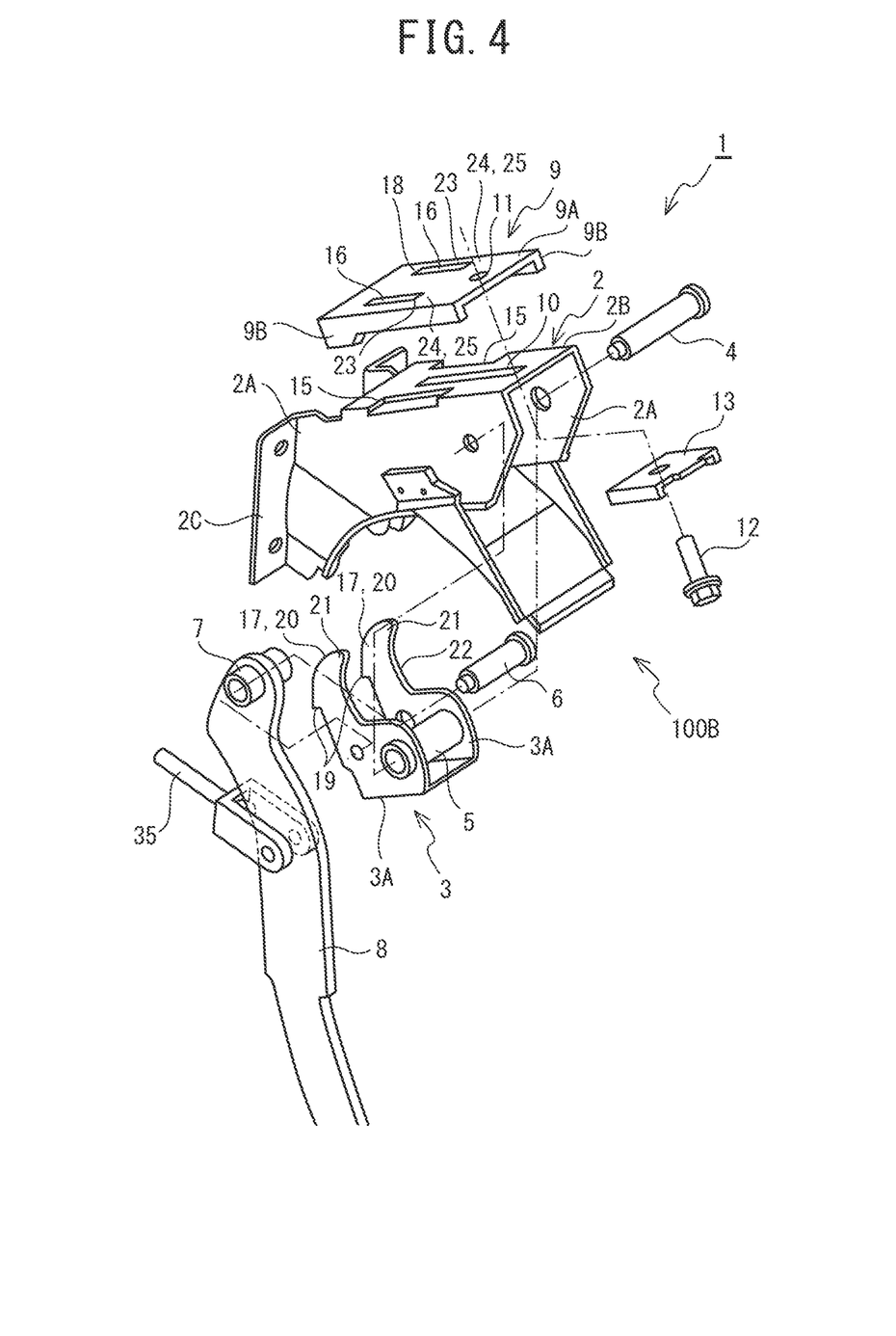
FIG. 4 is an exploded perspective view illustrative of a pedal rearward movement suppression mechanism according to an embodiment of the present disclosure.
Figure 5:
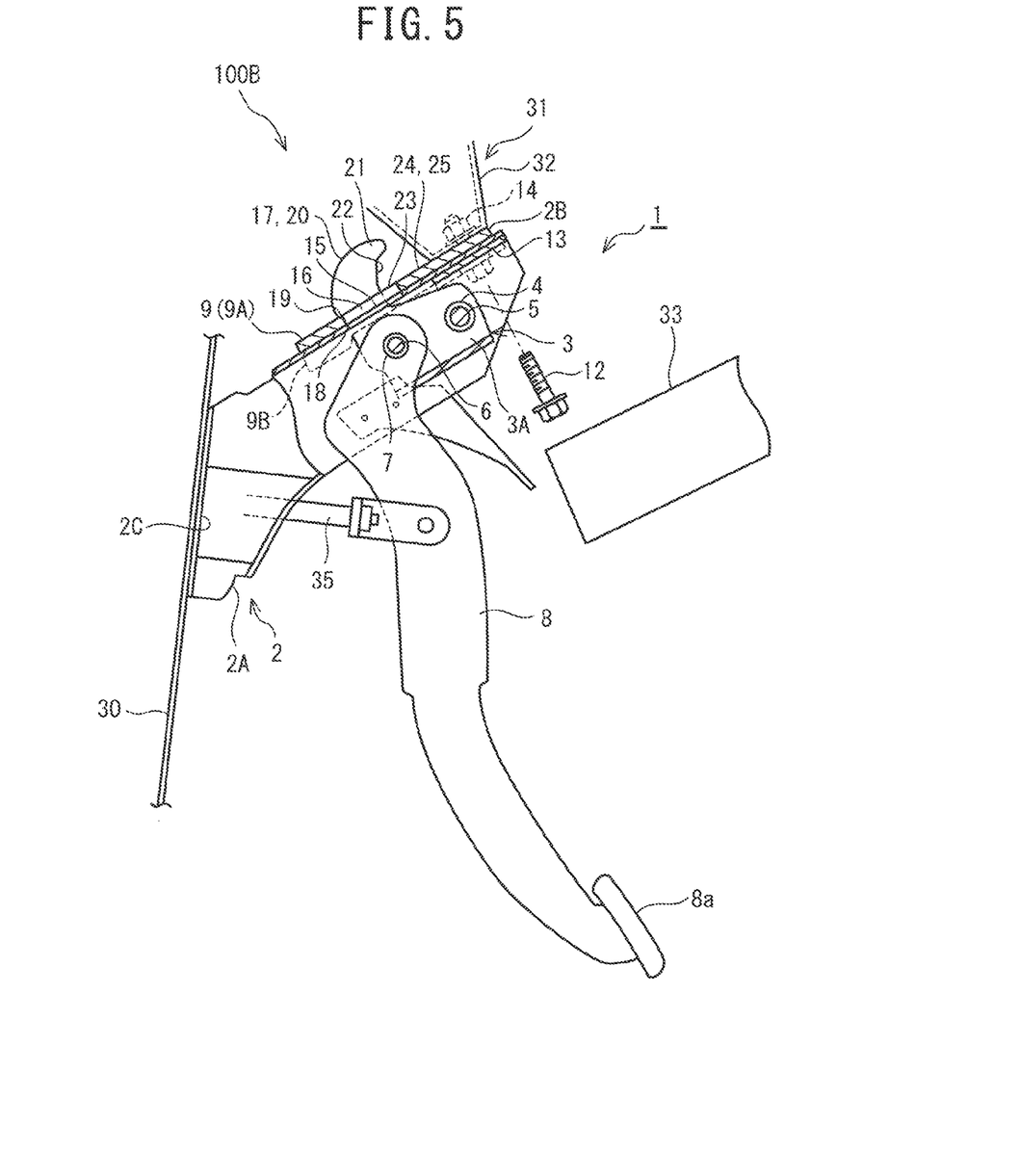
FIG. 5 is a sectional side view illustrative of the pedal rearward movement suppression mechanism according to an embodiment of the present disclosure.

A flange portion 2C is formed on the front side of a pedal bracket 2 in the front-rear direction of the vehicle, and the flange portion 2C is fastened and fixed to a dash lower panel 30 of the dash panel by bolts and nuts, not illustrated. The pedal bracket 2 is a member having a substantially U-shaped cross-sectional shape and includes a pair of sidewall portions 2A disposed spaced from each other and an upper wall portion 2B connecting the sidewall portions thereabove.

Furthermore, a pivot bracket 3 having a substantially U-shape is pivotally and rotatably supported by a shaft 4 provided on the pedal bracket 2 via a collar 5. A pedal shaft 6 is provided at the pivot bracket 3 in front of the shaft 4 in the front-rear direction of the vehicle such that the pedal shaft 6 straddles sidewall portions 3A of the pivot bracket 3 facing each other. A pedal arm 8 is pivotally and rotatably supported by the pedal shaft 6 via a collar 7.

A slide plate 9 is fixed at a lower surface portion of the vehicle body side member 31 such as a dash upper panel connected to the upper end of the dash lower panel 30 and extending rearward in the front-rear direction of the vehicle. The slide plate 9 is a substantially flat plate-like member fixed to and overlapping the upper surface portion of the upper wall portion 2B of the pedal bracket 2. In the present embodiment, the slide plate 9 is formed in a dish shape having downward flanges 9B at both sides of an upper wall 9A. The flanges 9B cover the upper wall portion 2B of the pedal bracket 2.

Specifically, the slide plate 9 is attached as follows. That is, bolt insertion holes 10 and 11 are formed the upper wall portion 2B of the pedal bracket 2 and the upper wall 9A of the slide plate 9, respectively. Then, the rear end portion of the slide plate 9 is fastened and fixed to the lower surface of a vehicle side bracket 32 connected and disposed on the lower surface of the vehicle body side member 31 such as the dash panel with the upper wall portion 2B of the pedal bracket 2 by a bolt 12 inserted through the bolt insertion holes 10 and 11 from a lower side of the vehicle, a fixing plate 13 provided on the lower surface side of the slide plate 9 (that is, a lower inner surface of the upper wall portion 2B of the pedal bracket 2), and a nut 14.

Furthermore, in the present embodiment, the bolt insertion hole 10 of the upper wall portion 2B is formed in a long hole shape extending frontward in the front-rear direction of the vehicle. In this way, the slide plate 9 is configured to be capable of relatively moving with respect to the pedal bracket 2 in the front-rear direction of the vehicle. Thus, there is constituted a collision absorbing means that allows a relative movement in the front-rear direction of the vehicle between the pedal bracket 2 and the slide plate 9 when an input in the rearward movement direction larger than a predetermined preset load is applied to the pedal bracket 2, to absorb a collision by a sliding friction between the upper wall portion 2B of the pedal bracket 2 and the upper wall 9A of the slide plate 9.

Furthermore, opening portions 15 are formed at edge portions on the both sides of the upper wall portion 2B of the pedal bracket 2, and hole portions (opening portions) 16 are formed on both side portions of a front end portion of the upper wall 9A of the slide plate 9. Protruding portions 17 are formed on front end portions of the sidewall portions 3A of the pivot bracket 3 so as to protrude upward, and the protruding portions 17 are inserted through the opening portions 15 and the hole portions 16. Then, a front end portion 18 of the hole portion 16 is engaged with a notch portion 19 formed on a front end portion of the protruding portion 17.

Therefore, at a normal time when a collision does not occur, the front end portion 18 of the hole portion 16 of a front end portion of the slide plate 9 is engaged with the notch portion 19 of the front end portion of the pivot bracket 3, as mentioned above. In this way, downward rotation of the pivot bracket 3 is restricted and a depression position of the pedal arm 8 is restricted to be positioned at a predetermined position. As a result, the pedal arm 8 rotates with the pedal shaft 6 as a fulcrum, and it is possible to make the servo unit 70 activate a master vac normally via the input rod 35 coupled with the pedal arm 8.

Figure 7:
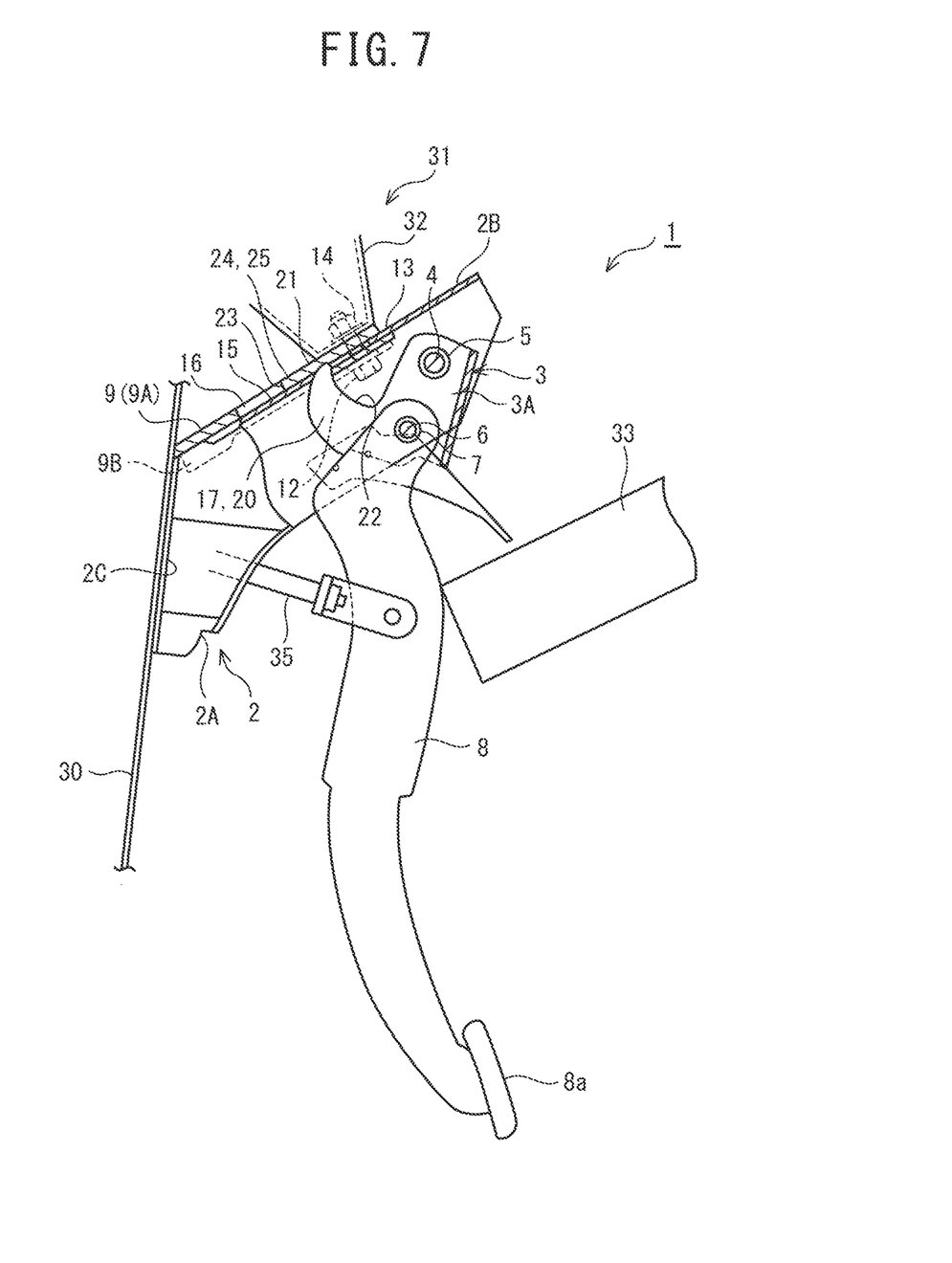
FIG. 7 is a sectional side view indicative of a pivot bracket after rotation.

Then, at the time of a front collision of the vehicle, the pedal bracket 2 relatively moves with respect to the slide plate 9 rearward in the front-rear direction of the vehicle within a length range of the bolt insertion hole 10 formed as a long hole. The relative movement releases the engagement between the protruding portion 17 of the pivot bracket 3 and the slide plate 9 and allows the rotation of the pivot bracket 3. Thus the protruding portion 17 is pushed forward by a rear edge 23 of the hole portion 16 of the slide plate 9. Accordingly, the pivot bracket 3 rotates rearward and downward with the shaft 4 as a fulcrum, and thus the pedal shaft 6 moves obliquely rearward and downward as illustrated in FIG. 7 with the rearward movement of the shaft 4. As a result, the pedal arm 8 rotates on a coupling point with the input rod 35 clockwise in FIG. 7, the depression position of the pedal arm 8 is pulled forward in the front-rear direction of the vehicle.

That is, the pedal shaft 6 of the pedal arm 8 moves rearward in the front-rear direction of the vehicle, and thus the depression position of the pedal arm 8 moves forward accordingly.

Furthermore, in the present embodiment, the protruding portion 17 is used as a rotation assist pressing portion 20 that comes into contact with the vehicle side bracket 32 provided on the vehicle body side member 31 when the pivot bracket 3 rotates to assist the rearward and downward rotation of the pivot bracket 3.

Figure 6A:
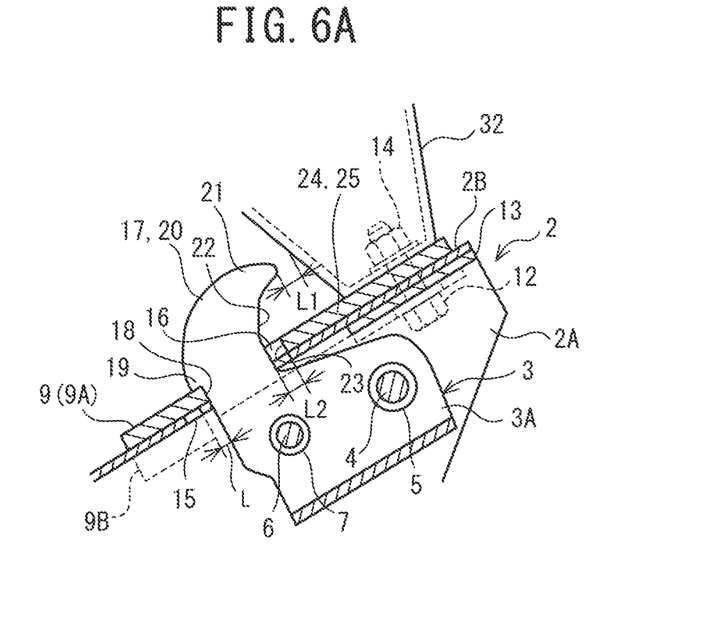
FIG. 6A is a sectional side view indicative of a substantial part in the middle of rotation at a normal time according to an embodiment of the present disclosure.

The rotation assist pressing portion 20 is formed to have a rear end portion 21 protruding rearward, that is, toward the vehicle side bracket 32 positioned rearward thereof. As illustrated in FIG. 6A, the gap (L1) between the rear end portion 21 of the rotation assist pressing portion 20 and the vehicle side bracket 32 is set to be slightly larger than an engagement allowance (L) of the engaging portion between the pivot bracket 3 and the slide plate 9.

Figure 6B:
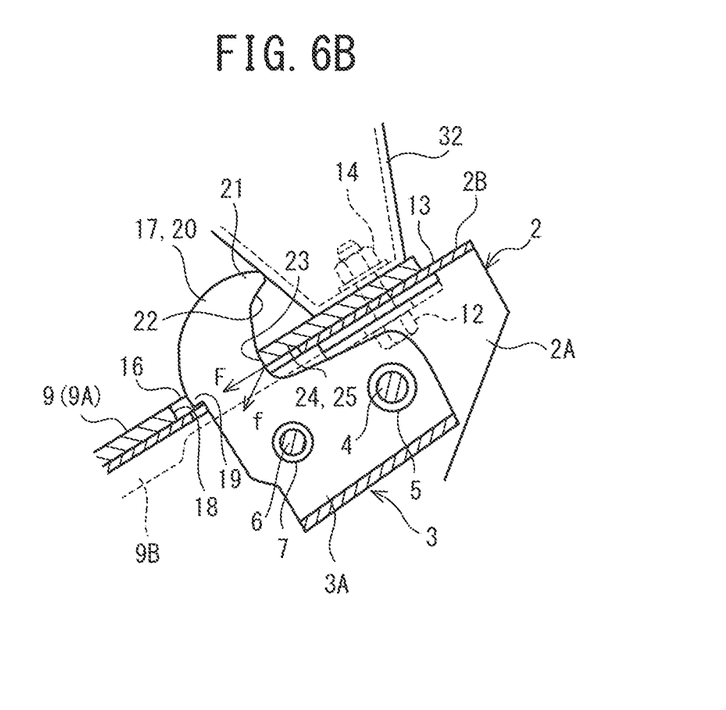
FIG. 6B is a sectional side view indicative of the substantial part in the middle of rotation at the time of collision according to an embodiment of the present disclosure.

Furthermore, as illustrated in FIG. 6B, a rear edge portion 22 of the rotation assist pressing portion 20 is formed in a curved shape. The curved shape is determined such that, when the slide plate 9 relatively moves forward with respect to the pedal bracket 2 to come into contact with the rear edge 23 of the hole portion 16, a force component "f" input from the slide plate 9 to the rear edge portion 22 is applied substantially downward. Naturally, a gap (L2) between the rear edge portion 22 of the rotation assist pressing portion 20 and the opening portion 15 and a gap (L2) between the rear edge portion 22 and the hole portion 16 are set to be slightly larger than the engagement allowance (L) of the engaging portion between the pivot bracket 3 and the slide plate 9 such that the rear edge 23 of the hole portion 16 surely comes contact with the slide plate 9, after the engagement of the engaging portion is released.

Furthermore, the slide plate 9 is provided with a restriction portion 24. The restriction portion 24 is configured, when the rotating pivot bracket 3 receives a force in an opposite direction to the rotating direction of the pivot bracket 3 by interference between the pedal arm 8 and a peripheral component 33, to come into contact with the rotation assist pressing portion 20 to restrict the rotation of the pivot bracket 3 in the opposite direction. The restriction portion 24 is provided rearward the hole portion 16 of the slide plate 9, and includes an opening cover portion 25 (specifically, a portion of the upper wall 9A of the slide plate 9) configured to close the opening portion 15 of the pedal bracket 2 by the relative movement of the slide plate 9 when the input in the rearward direction larger than the predetermined load is applied to the pedal bracket 2. In the present embodiment especially, the bolt insertion hole 10 formed in the long hole shape is formed to have such a length that the slide plate 9 can relatively move until the opening cover portion 25 of the slide plate 9 closes the opening portion 15 of the pedal bracket 2.

According to the structure of the above-mentioned embodiment, since the rotation of the pivot bracket 3 is restricted by the slide plate 9 in a normal state, the pedal arm 8 rotates with the pedal shaft 6 as a fulcrum, and it is possible to make the servo unit 70 activate the master vac normally via the input rod 35 coupled with the pedal arm 8.

On the other hand, at the time of a front collision of the vehicle, the slide plate 9 and the pedal bracket 2 relatively move in the front-rear direction of the vehicle within the range of the length of the bolt insertion hole 10. In this way, the engagement between the pivot bracket 3 and the slide plate 9 is released to allow the rotation of the pivot bracket 3. The pivot bracket 3 rotates rearward and downward with the shaft 4 as a fulcrum, and thus the depression position of the pedal arm 8 is pulled forward in the front-rear direction of the vehicle. Therefore, even if the servo unit 70 moves rearward, or even if a dash lower panel 40 is deformed toward a vehicle interior, and thus the input rod 35 extending from the servo unit moves rearward, it is possible to avoid the rearward displacement of the depression position of the pedal arm 8 which causes an odd feeling.

Furthermore, the rotation assist pressing portion 20 is projected upward the vehicle from the upper portion of the pivot bracket 3. The rotation assist pressing portion 20 comes into contact with the vehicle side bracket 32 as the vehicle body side member 31 when the pivot bracket 3 rotates to assist the downward and rearward rotation of the pivot bracket 3. Therefore, it is possible to forcibly rotate the pivot bracket 3 downward and rearward.

Furthermore, the rotation assist pressing portion 20 is provided rearward the engaging portion between the pivot bracket 3 and the slide plate 9 in the front-rear direction of the vehicle, and is projected toward the vehicle side bracket 32 positioned rearward the rotation assist pressing portion 20. Furthermore, a gap between the rear end portion 21 of the rotation assist pressing portion 20 and the vehicle side bracket 32 is set to be slightly larger than the engagement allowance of the engaging portion. Therefore, immediately after the engagement between the slide plate 9 and the pivot bracket 3 is released, the rotation assist pressing portion 20 comes into contact with the vehicle side bracket 32 positioned rearward the rotation assist pressing portion 20, and thus it is possible to promptly rotate the pivot bracket 3 downward and rearward.

Moreover, the rear edge portion 22 of the rotation assist pressing portion 20 is formed in the curved shape such that, when the slide plate 9 relatively moves forward with respect to the pedal bracket 2 to come into contact with the rear edge 23 of the hole portion 16, a force component "f" input from the slide plate 9 to the rear edge portion 22 is applied substantially downward. Therefore, it is possible to more surely rotate the pivot bracket 3 downward and rearward.

Furthermore, the slide plate 9 is provided with the restriction portion 24 that is configured, when the rotating pivot bracket 3 receives the force in the opposite direction to the rotating direction of the pivot bracket 3 by the interference between the pedal arm 8 and the peripheral component 33, to come into contact with the rotation assist pressing portion 20 to restrict the rotation of the pivot bracket 3 in the opposite direction. Therefore, even if the interference between the pedal arm 8 and the peripheral component at the time of a collision of the vehicle may generate a rotation force in the opposite direction to return the pivot bracket 3 to a previous position by any chance, the restriction portion 24 can suppress the rotation of the pivot bracket 3 in the opposite direction.

It is to be noted that an example in which the pedal bracket 2 is fixed to the vehicle side bracket 32 provided on the lower surface portion of the dash upper panel is described in the above description. The present disclosure is not limited thereto. The pedal bracket 2 may be fixed to a vehicle body side member such as a steering member, for example, that is positioned upward and rearward the dash lower panel 30 and extends in a vehicle width direction, for example.

Next, the configuration of the pedal bias unit 100C will be described.

The pedal bias unit 100C constitutes a mechanism configured to bias the input rod 35 in a direction to which a brake pedal 8a returns (hereinafter, referred to as "returning direction"), when the depression operation position of the brake pedal 8a lies at least within the invalid depression region. As illustrated in FIG. 2, the pedal bias unit 100C includes an elastic body 82 having one end portion attached to the input rod 35 and the other end portion attached to the vehicle body side member 31 to provide a spring force to the input rod 35 in the returning direction of the brake pedal 8a.

In the present embodiment, the other end portion of the elastic body 82 is positioned in the returning direction of the brake pedal 8a from the one end portion.

Figure 8:
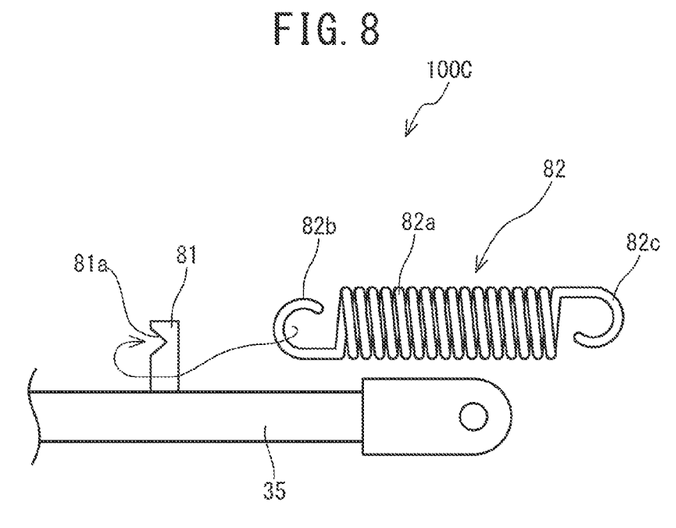
FIG. 8 is a view indicative of an elastic body before being attached to a notch portion according to an embodiment of the present disclosure for illustrating attachment of the elastic body to the notch portion.

As illustrated in FIG. 8, a protruding portion 81 is formed on the input rod 35. The protruding portion 81 protrudes in an outer diameter direction from the input rod 35. In an example of the present embodiment illustrated in FIG. 8, the protruding portion 81 is formed to rise upward from the input rod 35, but the protruding portion 81 may protrude downward or laterally. The first spring engaging portion is formed at the protruding portion 81. The first spring engaging portion of the present embodiment is formed as a notch portion 81a opening forward in the front-rear direction of the vehicle. The notch portion 81a of the present embodiment is formed in a wedge shape having a vertical width that becomes narrower toward the rear in the front-rear direction of the vehicle. It is to be noted that the tip portion of the notch portion 81a may be sharp or rounded.

A second spring engaging portion is formed at the vehicle body side member 31 positioned rearward from the protruding portion 81 in the front-rear direction of the vehicle. The second spring engaging portion of the present embodiment is formed as an opening portion on the vehicle body side member 31.

The elastic body 82 includes a coil spring 82a as a main body, and hook portions 82b and 82c formed at the both ends in a longitudinal direction of the coil spring 82a as attachment parts. Then, one hook portion 82b is hooked on the notch portion 81a as the first spring engaging portion and the other hook portion 82c is hooked on the second spring engaging portion.

It is to be noted that the axis of the coil spring 82a is set to be parallel or substantially parallel with the input rod 35.

(Operation or the Like)

When the driver depresses the brake pedal 8a, the input rod 35 moves toward the master cylinder 74 in conjunction with the depression amount and the push rod 71 also moves toward the master cylinder 74 depending on the movement of the input rod 35. In this situation, when the depression operation position of the brake pedal 8a lies within the invalid depression region, at least one hydraulic chamber of the master cylinder 74 communicates with the reservoir tank 75, and thus the master cylinder 74 is in a state not to generate the base hydraulic pressure.

Herein, the depression force in the operation of the brake pedal 8a is formed by a reaction force by a pedal device and the servo unit 70, and a hydraulic reaction force generated in the master cylinder 74. The balance between the depression force and the stroke is important for improvement in controllability. However, when the invalid depression region is added as mentioned above, the pedal depression force is reduced in the invalid depression region, since the internal pressure of the master cylinder 74 becomes zero or decreases, and thus the controllability is worsened.

On the other hand, by providing the pedal bias unit 100C, the spring force of the elastic body 82 is generated by the pedal bias unit 100C depending on the stroke amount of the input rod 35 even within the invalid depression region, and the spring force of the elastic body 82 is added as the depression force in the operation of the brake pedal 8a. As a result, the worsening of the controllability of the brake pedal 8a is suppressed.

Herein, in an ordinary brake system, a necessary deceleration is obtained by controlling the hydraulic pressure in the master cylinder 74 depending on the operation of the brake pedal 8a. In the present embodiment, however, since it is necessary to automatically control the hydraulic pressure depending on a regeneration torque in order to obtain a regeneration cooperation brake system, a certain invalid depression region in which the hydraulic pressure does not occur in the master cylinder 74 regardless of the pedal operation is added, and the deceleration is controlled depending on the regeneration torque and by the automatic hydraulic pressure control device in the invalid depression region.

It is to be noted that when an elastic body for reaction force is inserted between a sleeve and a servo unit such that the elastic body is coaxially disposed on the outer circumference of the input rod like the above-mentioned PTL 1, and when the input rod swings in a direction perpendicular to the axis direction, a displacement of the input rod in the direction perpendicular to the axis direction is restricted by the bending of the elastic body for reaction force in the direction perpendicular to the axis direction. On the other hand, in the pedal bias unit 100C of the present embodiment, the elastic body 82 is disposed so as to couple the input rod 35 and the vehicle body side member 31. Thus, it is possible to avoid bending of the elastic body 82 even if the input rod 35 is displaced in the direction perpendicular to the axis direction. Therefore, the pedal bias unit 100C of the present embodiment reduces the restriction on the displacement of the input rod 35 in the direction perpendicular to the axis direction as compared with the elastic body of reaction force in the prior art document.

Furthermore, the elastic body of reaction force described in PTL 1 has to secure a space over the outer circumference of the input rod for dispose the elastic body between the servo unit and the brake pedal. Therefore, it is necessary to move the disposed position of the servo unit forward in the front-rear direction of the vehicle or to move the disposed position of the brake pedal rearward in the front-rear direction of the vehicle. The former may narrow an engine room and the latter may narrow the vehicle interior. On the other hand, the pedal bias unit 100C of the present embodiment does not have to be disposed between the servo unit 70 and the brake pedal 8a over the outer circumference of the input rod 35. Therefore, it is possible to avoid such a problem.

Furthermore, the present embodiment includes the pedal rearward movement suppression mechanism 100B for the time of a collision. That is, at the time of a front collision of the vehicle, the slide plate and the pedal bracket relatively moves in the front-rear direction of the vehicle, and thus the engagement between the pivot bracket and the slide plate is released. This allows the rotation of the pivot bracket and rotates the pivot bracket downward and rearward with the shaft as a fulcrum, and the depression position of the pedal arm 8 is pulled forward in the front-rear direction of the vehicle. Therefore, even if the servo unit 70 moves rearward or even if the dash lower panel is deformed toward the vehicle interior, and thus the push rod 71 extending from the servo unit 70 moves rearward, it is possible to avoid the rearward displacement of the depression position of the pedal arm 8 that causes an odd feeling. Furthermore, the rotation assist pressing portion is projected upward the vehicle from the upper portion of the pivot bracket, and the rotation assist pressing portion comes into contact with at least one of the vehicle body side member or the slide plate when the pivot plate rotates and assists the downward and rearward rotation of the pivot bracket. The opening portion from which the rotation assist pressing portion protrudes is formed on the upper wall portion of the pedal bracket and the slide plate. Therefore, it is possible to forcibly rotate the pivot bracket downward and rearward.

In this way, when the pedal rearward movement suppression mechanism 100B operates to suppress the rearward movement of the brake pedal 8a at the time of a front collision of the vehicle, the input rod 35 has to displace in the direction perpendicular to the axis direction. However, in the case in which the elastic body for reaction force like the prior art document is adopted, the operation of the pedal rearward movement suppression mechanism 100B may be disturbed. That is, in a case the elastic body is combined with a brake device having a mechanism configured to suppress the rearward movement amount of the brake pedal 8a at a time of a collision, as a reduction measure for influence of a collision accident to an occupant, the function of the pedal rearward movement suppression mechanism 100B might be disturbed depending on how to dispose the elastic body for generating the pedal reaction force within the invalid depression region. Specifically, in the above-mentioned prior art document, there is a force pushing back the brake pedal 8a to an initial position. Since the force acts to move the brake pedal 8a rearward, the rearward movement amount suppressing function may not operate at all, or a sufficient effect may not be obtained even if the function operates.

Figure 9:
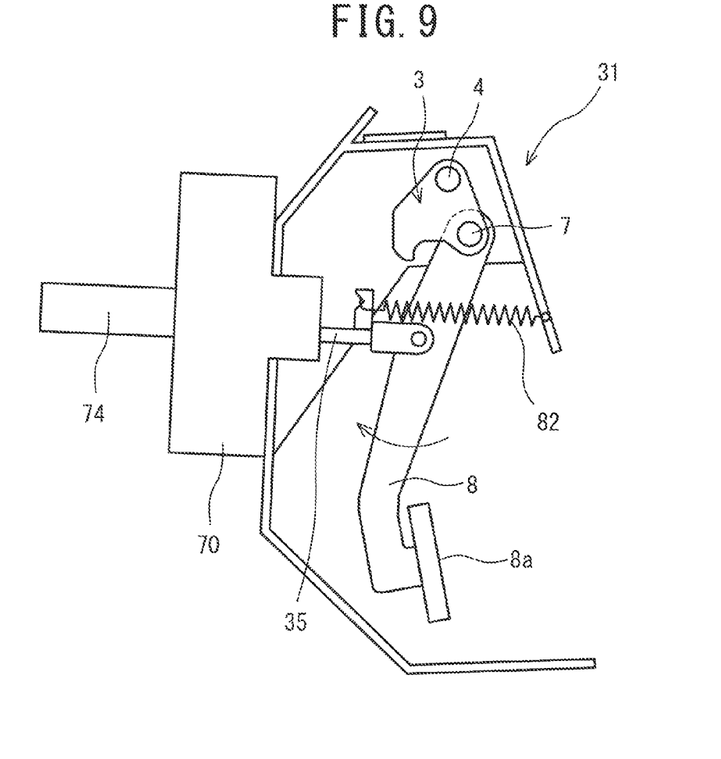
FIG. 9 is a schematic side view indicative of a operating state of the pedal rearward movement suppression mechanism according to an embodiment of the present disclosure.

On the other hand, in the present embodiment, by devising an attaching method of the elastic body 82, the elastic body 82 can serve as a biasing means in operating the pedal at a normal time, and can prevent disturbing the function of the pedal rearward movement suppression mechanism at the operating time thereof as illustrated in FIG. 9.

Furthermore, since the hook portion 82b of the elastic body 82 is merely hooked on the notch portion 81a constituting the first spring engaging portion, the hook portion 82b easily disengages from the notch portion 81a as the first spring engaging portion when the rear end portion of the input rod 35 swings at the operating time of the pedal rearward movement suppression mechanism. The notch portion 81a, especially, is formed in a wedge shape having an inclined upper portion and an inclined lower portion. Therefore, when the rear end portion of the input rod 35 displaces in the vertical direction, the slope of one of the upper portion and the lower portion becomes larger, and thus the hook portion 82b more easily disengages.

Figure 10A:
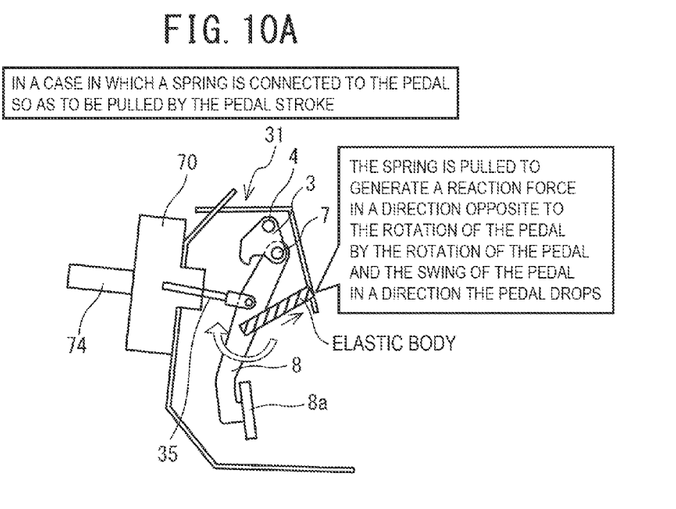
FIGS. 10A and 10B are views illustrative of a problem in a case where one end portion of the elastic body is attached to a pedal arm.
Figure 10B:
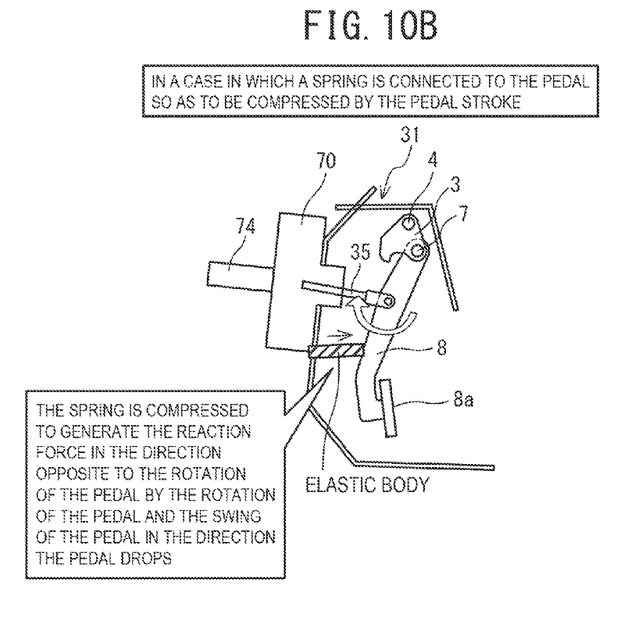

Herein, one end portion of the elastic body 82 may be attached to the pedal arm 8 instead of being attached to the input rod 35 (see FIGS. 10A and 10B). However, when one end portion of the elastic body 82 attached to the pedal arm 8, a moment assisting a forward movement of the brake pedal 8a is undesirably applied on the pedal arm 8, at the operating time of the pedal rearward movement suppression mechanism, as illustrated in FIGS. 10A and 10B. That is, as illustrated in FIG. 10A, when a spring is connected to the pedal so as to be pulled by the pedal stroke, the spring is pulled to generate a reaction force in a direction opposite to the rotation of the pedal by the rotation of the pedal and the swing of the pedal in a direction the pedal drops. On the other hand, as illustrated in FIG. 10B, when a spring is connected to the pedal so as to be compressed by the pedal stroke, the spring is compressed to generate the reaction force in the direction opposite to the rotation of the pedal by the rotation of the pedal and the swing of the pedal in the direction the pedal drops.

On the other hand, in the present embodiment, by attaching one end portion of the elastic body 82 to the input rod 35, it is possible to suppress applying of a moment that assists the forward movement of the brake pedal 8a to the pedal arm 8.

Herein, the present embodiment does not limit the configuration of the servo unit 70, and can be applied to any system having an invalid stroke in which the hydraulic pressure is not generated in the master cylinder 74 with a certain amount of the pedal operation. The servo unit 70 may be a negative pressure booster, a hydraulic booster, an electric booster, or the like, and the type thereof is not limited. Furthermore, any configuration and structure of the pedal rearward movement suppression mechanism may be applied.

Effects of the Present Embodiment (1) The vehicle brake device includes the depression invalidation mechanism 100A, the pedal rearward movement suppression mechanism 100B, and the pedal bias unit 100C configured to bias the input rod 35 in the returning direction of the brake pedal 8a, when the depression operation position of the brake pedal 8a lies at least within the invalid depression region. The pedal bias unit 100C includes the elastic body 82 having one end portion attached to the input rod 35 and the other end portion attached to the vehicle body side member 31 to provide the spring force to the input rod 35 in the returning direction of the brake pedal 8a.

Acceding to the constitution, by applying the reaction force generated by the elastic body 82 to the pedal, it is possible to restrain the swing of the pedal from being disturbed even in the case in which the depression operation position of the brake pedal 8a lies within the invalid depression region.

Furthermore, by attaching one end portion of the elastic body 82 to the input rod 35, it is possible to prevent the elastic body 82 from restricting the suppression of the rearward movement of the brake pedal 8a when the pedal rearward movement suppression mechanism 100B operates. Thus, the pedal rearward movement suppression mechanism 100B can operate efficiently.

Herein, when the elastic body 82 is attached to the pedal arm 8 (see FIGS. 10A and 10B), there may be a problem that the elastic body 82 restricts the rotation of the brake pedal 8a by the operation of the pedal rearward movement suppression mechanism 100B. The present embodiment can avoid such a problem.

(2) One end portion of the elastic body 82 is attached to the input rod 35 such that the elastic body 82 is rotationally displaceable at least in the vertical direction.

In this way, it is possible to reduce the disturbing amount of the swing of the input rod 35 by the spring force of the elastic body 82 in the direction perpendicular to the axis direction, and to further restrain the swing of the pedal from being disturbed when the pedal rearward movement suppression mechanism 100B operates. As a result, the pedal rearward movement suppression mechanism can operate more efficiently.

(3) The protruding portion 81 is formed on the input rod 35. The protruding portion 81 protrudes in the outer diameter direction from the input rod 35. The notch portion 81a is formed at the protruding portion 81. One end portion of the elastic body 82 is hooked on the notch portion 81a.

According to the configuration, the engagement between one end portion of the elastic body 82 and the input rod 35 is easily released when the input rod 35 swings at the operating time of the pedal rearward movement suppression mechanism 100B. When the elastic body 82 disengages from the input rod, there is no reaction force by the additional elastic body 82 restricting the swing of the pedal and the movable part (the input rod 35). As a result, the pedal rearward movement suppression mechanism can operate more efficiently.

(4) The notch portion 81*a* is formed in a shape having a vertical width that becomes narrower toward the rear in the front-rear direction of the vehicle. That is, the notch portion 81*a* is formed in a wedge shape. It is preferable that the notch become deeper in the bias direction by the elastic body 82.

According to the configuration, one end portion of the elastic body 82 engaged with the input rod 35 can easily disengage from the input rod 35, when the input rod 35 swings more than a preset range.

According to the vehicle brake device, even in a case where the depression operation position of the brake pedal lies at least within the invalid depression region, the pedal reaction force can be generated on the brake pedal by the spring force of the elastic body. In this situation, it is not necessary to coaxially dispose the elastic body on the outer circumference of the input rod. Thus, even if there is the elastic body for generating the pedal reaction force, it is possible to allow a more displacement of the input rod in the direction perpendicular to the axis direction, accordingly.

This application claims priority from Japanese Patent Application No. 2013-027300 (filed on Feb. 15, 2013), which is incorporated herein by reference in its entirety.

While a limited number of embodiments have been described with illustration herein, it should be apparent that the present disclosure is not limited to them and modifications and adaptations to each of the embodiments on the basis of the above disclosure may occur to one skilled in the art.

REFERENCE SIGNS LIST

2 pedal bracket
3 pivot bracket
6 pedal shaft
8 pedal arm
8*a* brake pedal
35 input rod
40 dash lower panel
70 servo unit
71 push rod
74 master cylinder
75 reservoir tank
81 protruding portion
81*a* notch portion
82 elastic body
82*b* hook portion
100A depression invalidation mechanism
100B pedal rearward movement suppression mechanism
100C pedal bias unit s invalid stroke distance (corresponding to invalid depression region)

The invention claimed is:

1. A vehicle brake device comprising:
a brake pedal;
a pedal arm on which the brake pedal is provided, the pedal arm being supported to be rotatable relative to a vehicle body side member;
an input rod coupled to the pedal arm to move forward and rearward in conjunction with a depression operation on the brake pedal;
a master cylinder to which a forward and rearward movement of the input rod is transmitted via a brake booster;
a pedal rearward movement suppression mechanism including a pedal bracket supporting the pedal arm via at least a pedal shaft, wherein a slide plate fixed at the vehicle body side member is configured to be movably engaged with the pedal bracket such that a sliding between the pedal bracket and the slide plate suppresses a rearward movement of the brake pedal in a front-rear direction of a vehicle when an impact in the front-rear direction equal to or larger than a preset load is applied to the pedal bracket on the vehicle body side member;
a pedal bias unit configured to bias the input rod in a direction to which the brake pedal returns; and
a protruding portion formed on the input rod,
wherein the pedal bias unit includes an elastic body including one end portion attached to the input rod and the other end portion attached to the vehicle body side member to provide a spring force to the input rod in the direction to which the brake pedal returns,
the protruding portion protrudes in an outer diameter direction from the input rod,
a notch portion is formed at the protruding portion, the notch portion comprising a forward-facing opening, and
the one end portion of the elastic body is hooked on the notch portion to attach the one end portion of the elastic body to the input rod such that the elastic body disengages from the notch portion in response to the sliding between the pedal bracket and the slide plate.

2. The vehicle brake device according to claim 1, wherein the notch portion is formed in a wedge shape.

3. The vehicle brake device according to claim 1, wherein the notch portion has a vertical width that becomes narrower toward the rear in the front-rear direction of the vehicle.

4. The vehicle brake device according to claim 1, wherein the forward-facing opening has a vertical width that becomes narrower toward the rear in the front-rear direction of the vehicle.

* * * * *